United States Patent
Chiang et al.

(10) Patent No.: US 12,071,522 B2
(45) Date of Patent: *Aug. 27, 2024

(54) LIQUID COLOR MASTERBATCH COMPOSITION AND FABRICATING METHOD FOR COLORED FIBER

(71) Applicant: TAIWAN TEXTILE RESEARCH INSTITUTE, New Taipei (TW)

(72) Inventors: Rih-Sheng Chiang, New Taipei (TW); Wei-Jen Lai, New Taipei (TW); Li-Hsien Chao, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 114 days.

This patent is subject to a terminal disclaimer.

(21) Appl. No.: 17/673,943

(22) Filed: Feb. 17, 2022

(65) Prior Publication Data

US 2022/0348726 A1 Nov. 3, 2022

(30) Foreign Application Priority Data

Apr. 23, 2021 (TW) .................................. 110114722

(51) Int. Cl.
*C08J 3/22* (2006.01)
*C08L 67/00* (2006.01)
*C09B 47/30* (2006.01)
*C09B 67/20* (2006.01)
*D01D 5/08* (2006.01)
*D01F 6/62* (2006.01)

(52) U.S. Cl.
CPC ................ *C08J 3/22* (2013.01); *C08L 67/00* (2013.01); *C09B 47/30* (2013.01); *C09B 67/0063* (2013.01); *D01D 5/08* (2013.01); *D01F 6/62* (2013.01); *C08J 2367/00* (2013.01); *C08J 2371/02* (2013.01); *C08L 2203/12* (2013.01); *C08L 2310/00* (2013.01)

(58) Field of Classification Search
CPC ................ C08J 2367/00; C08J 2367/02; C08J 2371/02; C08J 2471/02; C08J 3/22; C08J 3/223; C08J 3/226; C08L 2203/12; C08L 2310/00; C08L 67/00; C09B 47/30; C09B 67/0063; D01D 5/08; D01F 1/04; D01F 6/62

See application file for complete search history.

(56) References Cited

U.S. PATENT DOCUMENTS

| | | | |
|---|---|---|---|
| 2010/0089289 A1 | 4/2010 | Mahiat et al. | |
| 2010/0204395 A1* | 8/2010 | Rajaraman | C08K 5/0008 524/559 |
| 2013/0298804 A1 | 11/2013 | Fatta | |

FOREIGN PATENT DOCUMENTS

| | | |
|---|---|---|
| CN | 101522840 A | 9/2009 |
| CN | 101802051 A | 8/2010 |
| CN | 105802114 A | 7/2016 |
| CN | 106280382 A | 1/2017 |
| CN | 106978639 A | 7/2017 |
| CN | 110003573 A | 7/2019 |
| TW | 202024409 A | 7/2020 |
| WO | WO-2017171641 A1 * | 10/2017 |

* cited by examiner

*Primary Examiner* — Shuangyi Abu Ali
(74) *Attorney, Agent, or Firm* — McClure, Qualey & Rodack, LLP

(57) ABSTRACT

A liquid color masterbatch composition for fabricating a colored fiber includes 30.0 to 44.4 parts by weight of a colorant, 14.0 to 44.4 parts by weight of a lubricant, and 11.2 to 56.0 parts by weight of a carrier, in which a viscosity of the liquid color masterbatch composition between 13000 cP and 18000 cP.

3 Claims, No Drawings

LIQUID COLOR MASTERBATCH COMPOSITION AND FABRICATING METHOD FOR COLORED FIBER

RELATED APPLICATION

This application claims priority to Taiwan Application Serial Number 110114722, filed Apr. 23, 2021, which is herein incorporated by reference.

BACKGROUND

Field of Invention

The present disclosure relates to a color masterbatch composition and a fiber, and particularly relates to a liquid color masterbatch composition and a colored fiber fabricated thereby.

Description of Related Art

In the fabricating process of the color masterbatch for fiber in the textile industry, color powders and plastic particles are usually stirred and mixed, and then the mixture is placed into a kneading extruder for kneading granulation. However, color spots are often generated on the color masterbatch for fiber that is fabricated by the above process due to the uneven dispersibility of the color powders, which leads to a poor color rendering property of the subsequently fabricated colored fiber. As a result, it is often necessary to add more colorants to solve the problem of poor color rendering property. Therefore, how to provide a color masterbatch for fiber which is capable of providing a colored fiber with a good color rendering property is a problem to be solved for the textile industry.

SUMMARY

The present disclosure provides a liquid color masterbatch composition for fabricating a colored fiber and a fabricating method for the colored fiber, in which the liquid color masterbatch composition has good dispersibility, such that the colored fiber fabricated thereby has a good color rendering property.

According to some embodiments of the present disclosure, a liquid color masterbatch composition for fabricating a colored fiber includes 30.0 to 44.4 parts by weight of a colorant. 14.0 to 44.4 parts by weight of a lubricant, and 11.2 to 56.0 parts by weight of a carrier, in which a viscosity of the liquid color masterbatch composition is between 13000 cP and 18000 cP.

In some embodiments of the present disclosure, a particle size (D90) of the liquid color masterbatch composition is between 310 nm and 390 nm.

In some embodiments of the present disclosure, the lubricant includes polyethylene glycol, and a weight average molecular weight of the polyethylene glycol is between 180 g/mole and 220 g/mole.

In some embodiments of the present disclosure, the colorant includes a blue colorant.

In some embodiments of the present disclosure, the blue colorant has a molecular structure represented by formula (1),

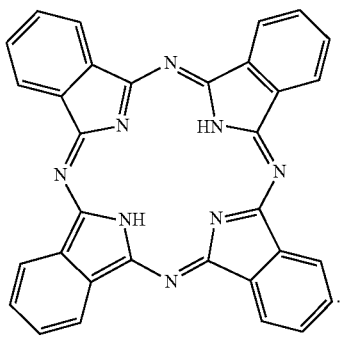

formula (1)

In some embodiments of the present disclosure, the carrier includes a nonionic surfactant, an anionic surfactant, a cationic surfactant, a zwitterionic surfactant, or combinations thereof.

According to some embodiments of the present disclosure, a fabricating method for a colored fiber includes the following steps. A mixing step is performed, such that polyester is uniformly mixed with the aforementioned liquid color masterbatch composition to form a mixture, in which a content of the polyester is between 237.8 parts by weight and 843.6 parts by weight, and a content of the liquid color masterbatch composition is between 90 parts by weight and 110 parts by weight. A kneading step is performed on the mixture, such that a color masterbatch for fiber is formed. A melt spinning step is performed on the color masterbatch for fiber, such that the colored fiber is formed.

In some embodiments of the present disclosure, in the mixing step, the polyester has a powder form.

In some embodiments of the present disclosure, the fabricating method for the colored fiber further includes the following step. A drying step is performed on the mixture before the mixing step.

In some embodiments of the present disclosure, in the mixing step, the polyester has a molten form, and the mixing step and the kneading step are performed in a same manufacturing process.

In the aforementioned embodiments of the present disclosure, since the liquid color masterbatch composition of the present disclosure includes an appropriate amount of the colorant, an appropriate amount of the lubricant, and an appropriate amount of the carrier, and the liquid color masterbatch composition has a suitable viscosity, the liquid color masterbatch composition can be provided with good dispersibility for uniformly mixing with the polyester in subsequence, and hence the colored fiber fabricated by the liquid color masterbatch composition has a good color rendering property.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The present disclosure provides a liquid color masterbatch composition for fabricating a colored fiber and a fabricating method for the colored fiber. The liquid color masterbatch composition of the present disclosure includes an appropriate amount of a colorant, an appropriate amount of a lubricant, and an appropriate amount of a carrier, and the liquid color masterbatch composition has a suitable viscosity. As such, the liquid color masterbatch composition is provided with good dispersibility for uniformly mixing with polyester in subsequence, and the colored fiber fabricated by the liquid color masterbatch composition has a good color rendering property.

The liquid color masterbatch composition of the present disclosure includes 30.0 to 44.4 parts by weight of a colorant, 14.0 to 44.4 parts by weight of a lubricant, and 11.2 to 56.0 parts by weight of a carrier. A viscosity of the liquid color masterbatch composition of the present disclosure is between 13000 cP and 18000 cP, thereby providing good dispersibity. In detail, if the viscosity of the liquid color masterbatch composition is less than 13000 cP, the liquid color masterbatch composition may be difficult to control due to its high fluidity, thus may not be uniformly mixed with polyester; if the viscosity of the liquid color masterbatch composition is greater than 18000 cP, the liquid color masterbatch composition may not be uniformly mixed with polyester due to low dispersibility. In some embodiments, a particle size (D90) of the liquid color masterbatch composition may be between 310 nm and 390 nm, such that the liquid color masterbatch composition is provided with good dispersibility to facilitate the subsequent fabrication of the colored fiber.

The liquid color masterbatch composition of the present disclosure includes 30.0 to 44.4 parts by weight of the colorant. The above content (ratio) of the colorant can provide the liquid color masterbatch composition with a sufficiently vivid color. In some embodiments, the colorant may be, for example, a blue colorant, such that the liquid color masterbatch composition and the subsequently formed colored fiber have a blue color. In some embodiments, the blue colorant may be, for example, a keto phthalocyanine (phthalocyanine blue) pigment, so as to provide good fastness, good heat resistance, and a vivid blue color. Specifically, the blue colorant may have a molecular structure represented by formula (1),

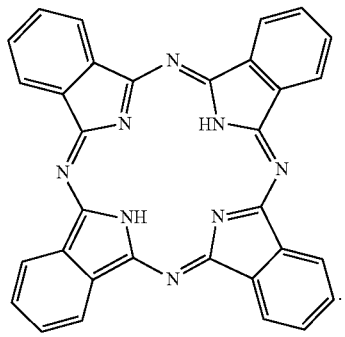

formula (1)

The liquid color masterbatch composition of the present disclosure includes 14.0 to 44.4 parts by weight of the lubricant. The above content (ratio) of the lubricant can provide the components in the liquid color masterbatch composition with good compatibility, such that the liquid color masterbatch composition has a suitable particle size, thereby providing good dispersibility. In some embodiments, the lubricant may include polyethylene glycol (PEG), and a weight average molecular weight of the polyethylene glycol may be between 180 g/mole and 220 g/mole. In detail, if the weight average molecular weight of the polyethylene glycol is less than 180 g/mole, the liquid color masterbatch composition may be too diluted and thus unfavorable for being uniformly mixed with polyester; if the weight average molecular weight of the polyethylene glycol is greater than 220 g/mole, the compatibility of the components in the liquid color masterbatch composition may be poor, such that the liquid color masterbatch composition has an excessively large particle size, which is not conducive to be uniformly mixed with polyester. On the other hand, the above range of the weight average molecular weight can also provide the liquid color masterbatch composition with good heat resistance, such that the liquid color masterbatch composition is suitable for the subsequent mixing step and/or spinning step.

The liquid color masterbatch composition of the present disclosure includes 11.2 to 56.0 parts by weight of the carrier. The above content (ratio) of the carrier can make the colorant uniformly disperse in the carrier, and can provide the liquid color masterbatch composition with good dispersibility. In some embodiments, the carrier may include a nonionic surfactant, an anionic surfactant, a cationic surfactant, a zwitterionic surfactant, or combinations thereof. When the colorant is the aforementioned keto phthalocyanine pigment, the carrier may preferably include the anionic surfactant, such that the colorant has better dispersibility. In some embodiments, the nonionic surfactant may include an ethoxy compound; the anionic surfactant may include phosphate, sulfonate, or combinations thereof; the cationic surfactant may include an organic ammonium salt, a quaternary ammonium salt, or combinations thereof; the zwitterionic surfactant may include amino acid.

Based on the above, since the liquid color masterbatch composition of the present disclosure includes an appropriate amount of the colorant, an appropriate amount of the lubricant, and an appropriate amount of the carrier, and the liquid color masterbatch composition has a suitable viscosity and particle size, the liquid color masterbatch composition can be provided with good dispersibility for the fabrication of the colored fiber with a good color rendering property. In the following description, a method for fabricating a colored fiber using the aforementioned liquid color masterbatch composition will be further described, that is, a fabricating method for a colored fiber of the present disclosure will be further described.

The fabricating method for the colored fiber of the present disclosure includes steps S10 to S30. In step S10, a mixing step is performed to uniformly mix polyester and the aforementioned liquid color masterbatch composition, such that a mixture is formed. In step S20, a kneading step is performed on the mixture, such that a color masterbatch for fiber is formed. In step S30, a melt spinning step is performed on the color masterbatch for fiber, such that the colored fiber is formed.

Before performing step S10, the aforementioned liquid color masterbatch composition may be fabricated firstly, Specifically, 30.0 to 44.4 parts by weight of the colorant, 14.0 to 44.4 parts by weight of the lubricant, and 11.2 to 56.0 parts by weight of the carrier can be mixed to form a mixed liquid, and then a dispersing step is performed on the mixed liquid to form the liquid color composition. In some embodiments, the dispersing step can be carried out by, for example, a three-roller device, and a rotation speed of a single roller can be between 10 rpm and 1000 rpm, so as to uniformly disperse the components in the liquid color masterbatch composition and make the liquid color masterbatch composition have a suitable particle size. As such, the liquid color masterbatch composition is provided with good dispersibility for being uniformly mixed with polyester in subsequence.

In step S10, a mixing step is performed to uniformly mix 90 parts by weight to 110 parts by weight of the liquid color masterbatch composition and 237.8 parts by weight to 843.6 parts by weight of polyester to form a mixture. In some embodiments, the liquid color masterbatch composition and the polyester can be uniformly mixed by screw stirring. In some embodiments, the mixing step can be, for example, carried out at room temperature, a time of the mixing step can be between 10 minutes and 30 minutes, and a rotation speed of the screw can be between 100 rpm and 500 rpm, so as to ensure the liquid color masterbatch composition is uniformly mixed with the polyester. In some embodiments, the polyester may be, for example, polyethylene terephthalate (PET), polybutylene terephthalate (PBT), or combinations thereof. In some embodiments, the polyester may have a powder form in the mixing step. In some other embodiments, the polyester may have a molten form in the mixing step. In other words, the mixing step can be a step mixing solid (the polyester with the powder form) and liquid (liquid color masterbatch composition), or a step mixing liquid (the polyester with the molten form) and liquid (liquid color masterbatch combination).

In some embodiments, when the polyester has a powder form in the mixing step, a drying step may be performed on the mixture after the mixing step and before the kneading step, such that the mixture has a powder form to facilitate the subsequent kneading step. In some embodiments, a temperature of the kneading step can be between 90° C. and 110° C., and a time of the kneading step can be between 12 hours and 24 hours, so as to ensure that the mixture is completely dried to have a powder form. In some other embodiments, when the polyester has a molten form in the mixing step, the mixing step and the subsequent kneading step may be performed in the same process, which will be described in more detail below in step S20.

In step S20, a kneading step is performed on the mixture, such that a color masterbatch for fiber is formed. In some embodiments, when the polyester has a powder form in the aforementioned mixing step, the resulting mixture with a powder form may undergo a kneading step to further form the color masterbatch for fiber, and a temperature of the kneading step may be between 220° C. and 250° C. In some other embodiments, when the polyester has a molten form in the aforementioned mixing step, the mixing step and the kneading step may be performed in the same process. In detail, the polyester can be placed in a kneading extruder to form a molten polyester, and the liquid color masterbatch composition can be injected into the kneading extruder at the same time to mix with the molten polyester, such that the mixing step and the kneading step are simultaneously carried out, in which temperature of the kneading step can be between 220° C. and 250° C., a feeding amount of the polyester can be, for example, between 85 g/min and 90 g/min, and a feeding amount of the liquid color masterbatch composition can be, for example, between 35 g/min and 40 g/min, so as to improve the color rendering properties of the color masterbatch for fiber and the colored fiber fabricated thereby. During the mixing step, the lubricant and carrier in the liquid color masterbatch composition can be pumped off, that is, the formed color masterbatch for fiber may include the colorant and the polyester but not the lubricant and the carrier.

After step S20 is performed, the color masterbatch for fiber can be formed. In the fabricating process of the color masterbatch for fiber, the colorant, the lubricant, and the carrier are uniformly mixed to form the liquid color masterbatch composition, and then the liquid color masterbatch composition and polyester are uniformly mixed and kneaded to form the color masterbatch for fiber; therefore, the dispersibility of the colorant in the color masterbatch for fiber can be improved, such that the problem of the uneven distribution of the colorant in the color masterbatch for fiber can be solved, and the color rendering property of the color masterbatch for fiber and the colored fiber fabricated thereby can be improved.

In step S30, a melt spinning step is performed on the color masterbatch for fiber to form a colored fiber. Specifically, the color masterbatch for fiber can be mixed with an appropriate amount of polyester (the material of which can be the same as the material of the aforementioned polyester) to perform the melt spinning step, thereby obtaining the colored fiber of the present disclosure. In some embodiments, a temperature of the melt spinning step may be between 275° C. and 295° C., so as to provide good spinnability to the color masterbatch for fiber. In some embodiments, based on a total weight of the colored fiber, a content of the colorant may be between 4 wt. % and 12 wt. %, such that the colored fiber is provided with a good color rendering property. It is worth mentioning that the colored fiber fabricated according to the above steps S10 to S30 can be an intrinsic colored fiber. That is, the fiber does not need to undergo an additional dyeing step to have its color. In some embodiments, the color of the colored fiber is similar to or the same as the color of the colorant in the aforementioned liquid color masterbatch composition.

It should be understood that the connection relationships and the functions of the components that have been described will not be repeated hereinafter. In the following description, various tests and evaluations will be performed on the liquid color masterbatch compositions and colored fibers of multiple comparative examples and multiple embodiments to further verify the efficacy of the present disclosure.

Experiment 1: Evaluation on Dispersibility of Liquid Color Masterbatch Compositions In this experiment, the dispersibility of the liquid color masterbatch compositions of each comparative example and each embodiment are evaluated. Specifically, this experiment is to measure the polymer dispersity index (PDI) of the liquid color masterbatch composition and visually observe the fluidity of the liquid color masterbatch composition on a three-roller device to perform evaluation on dispersibility. The detailed description and evaluation results of the liquid color masterbatch compositions of each comparative example and each embodiment are shown in Table 1.

TABLE 1

| | content of each component in the liquid color masterbatch composition (part by weight) | | | viscosity | particle size | | |
|---|---|---|---|---|---|---|---|
| | colorant | lubricant | carrier | (cP) | (D90) (nm) | PDI | fluidity |
| comparative example 1 | 50 | 50 | 0 | 18500 | 394 | 0.314 | slightly worse |
| embodiment 1 | 44.4 | 44.4 | 11.2 | 15630 | 359 | 0.271 | good |
| embodiment 2 | 30 | 14 | 56 | 13630 | 318 | 0.200 | good |

It can be seen from the results in Table 1 that when no carrier is added to the liquid color masterbatch composition, the viscosity, particle size, and PDI of the liquid color masterbatch composition are relatively large, resulting in poor fluidity and poor dispersibility; relatively, when the liquid color masterbatch composition includes an appropriate amount of the lubricant and the carrier, the viscosity, particle size, and PDI of the liquid master composition are relatively small, and the dispersibility is better.

Experiment 2: Evaluation on Color Rendering Property of Colored Fibers

In this experiment, the color rendering property of the colored fibers of each comparative example and each embodiment is evaluated. Comparative examples 2 to 3 are colored fibers formed by directly mixing polyester and colorants, and then performing a kneading step and a melt spinning on the mixture. Embodiments 3 to 8 are colored fibers formed by mixing polyester and the liquid color masterbatch composition of embodiments 1 to 2, and then performing a kneading step and a melt spinning on the mixture. The polyesters of embodiments 3 to 4 and 6 to 7 have a powder form the aforementioned mixing step, and the polyesters of embodiments 5 to 8 have molten form in the aforementioned mixing step. On the other hand by adjusting the content of the colorant (for the comparative examples) and the content of the liquid color masterbatch composition (for the embodiments), the colored fibers of comparative examples 2 to 3 and embodiments 3 to 5 have a darker color, and the colored fibers of comparative example 4 and embodiments 6 to 8 have a lighter color. Specifically, in this experiment, the color rendering property is evaluated through the L* value, a* value, and b* value of the colored fiber in the L*a*b* color space. The detailed evaluation results of the colored fibers of each comparative example and each embodiment are shown in Table 2.

TABLE 2

| | | liquid color masterbatch composition used | content of each component in the colored fiber (wt. %) | | (L*, a*, b*) |
|---|---|---|---|---|---|
| | | | colorant | polyester | |
| dark-colored fiber | comparative example 2 | N/A | 2.0 | 98.0 | (41.41, −20.57, −35.59) |
| | embodiment 3 | embodiment 1 | 1.0 | 09.0 | (42.85, −21.26, −35.67) |
| | embodiment 4 | embodiment 2 | 1.0 | 99.0 | (48.13, −21.18, −35.54) |
| | embodiment 5 | embodiment 2 | 1.0 | 99.0 | (42.64, −21.18, −36.06) |
| light-colored fiber | comparative example 3 | N/A | 0.2 | 99.8 | (62.18, −24.05, −31.34) |
| | embodiment 6 | embodiment 1 | 0.2 | 99.8 | (70.70, −23.98, −19.93) |
| | embodiment 7 | embodiment 2 | 0.2 | 99.8 | (77.25, −21.41, −16.79) |
| | embodiment 8 | embodiment 2 | 0.2 | 99.8 | (79.28, −20.47, −16.34) |

It can be seen from the results in Table 2 that for the dark-colored fibers, the color of the dark-colored fibers of embodiments 3 to 5 is very close to the color of the dark-colored fiber of comparative example 2, in which each of the dark-colored fibers of embodiments 3 to 5 merely has 1 wt. % of the colorant, while the dark-colored fiber of comparative example 2 has 2 wt. % of the colorant, showing that the liquid color masterbatch composition of the present disclosure can provide the dark-colored fiber with a good color rendering property. It can be seen from the results in Table 2 that for the light-colored fibers, the L* value of each of the light-colored fibers of embodiments 6 to 8 is significantly larger than the L* value of the light-colored fiber of comparative example 3, showing that the liquid color masterbatch composition of the present disclosure can provide the light-colored fiber with a lighter color (brighter color) and a better color rendering property under the premise that the light-colored fibers of embodiments 6 to 8 and comparative example 3 both have 0.2 wt. % of the colorant.

Experiment 3: Evaluation on Color Fastness to Washing, Sweat, and Light of Colored Fibers In this experiment, the colored fibers of comparative example 1 and embodiments 4 to 5 are evaluated for color fastness to washing, sweat, and light, in which color fastness to washing is performed under the AATCC 61-2013 1A standard method, color fastness to sweat is evaluated under the AATCC 15-2013 standard method, and the color fastness to light is evaluated under the AATCC 16.3 option 3 standard method. The evaluation results are shown in Table 3.

TABLE 3

|  | color fade | contamination |  |  |  |  | acetate acid |
|---|---|---|---|---|---|---|---|
|  |  | wool | acrylic | tedron | nylon | cotton |  |
| evaluation on color fastness to washing (level) |
| comparative example 1 | 4.5 | 4.5 | 4.5 | 4.5 | 4.5 | 4.5 | 4.5 |
| embodiment 4 | 4.5 | 4.5 | 4.5 | 4.5 | 4.5 | 4.5 | 4.5 |
| embodiment 5 | 4.5 | 4.5 | 4.5 | 4.5 | 4.5 | 4.5 | 4.5 |
| evaluation on color fastness to sweat (level) |
| comparative example 1 | 4.5 | 4.5 | 4.5 | 4.5 | 4.5 | 4.5 | 4.5 |
| embodiment 4 | 4.5 | 4.5 | 4.5 | 4.5 | 4.5 | 4.5 | 4.5 |
| embodiment 5 | 4.5 | 4.5 | 4.5 | 4.5 | 4.5 | 4.5 | 4.5 |
| evaluation on color fastness to light (level) |
| comparative example 1 | >4 | >4 | >4 | >4 | >4 | >4 | >4 |
| embodiment 4 | >4 | >4 | >4 | >4 | >4 | >4 | >4 |
| embodiment 5 | >4 | >4 | >4 | >4 | >4 | >4 | >4 |

It can be seen from the results in Table 3 that the colored fibers of embodiments 4 to 5 have hardly any color transfer to wool, acrylic, tedron, nylon, cotton, and acetic acid after the evaluation on color fastness to washing, sweat, and light, and the colored fibers of embodiments 4 to 5 and comparative example 1 have a comparable performance, indicating that the liquid color masterbatch composition of the present disclosure will not affect the performance of the colored fiber in color fastness to washing, sweat, and light, thereby providing a wide range of applications.

According to the aforementioned embodiments of the present disclosure, since the liquid color masterbatch composition of the present disclosure includes an appropriate amount of the colorant, an appropriate amount of the lubricant, and an appropriate amount of the carrier, and the liquid color masterbatch composition has suitable viscosity and particle size, the colored fiber fabricated by the liquid color masterbatch composition has a good color rendering property. On the other hand, the colored fiber fabricated by using the liquid color masterbatch composition of the present disclosure can have good color fastness to washing, sweat, and light, and thus providing a wide range of applications.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A liquid color masterbatch composition for fabricating a colored fiber, comprising:
   30.0 to 44.4 parts by weight of a colorant, wherein the colorant is a blue colorant, and the blue colorant has a molecular structure represented by formula (1),

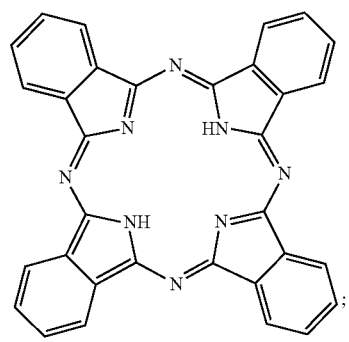

formula (1)

14.0 to 44.4 parts by weight of a lubricant; and
   11.2 to 56.0 parts by weight of a carrier, wherein the carrier is an anionic surfactant, and a viscosity of the liquid color masterbatch composition is between 13000 cP and 18000 cP.

2. The liquid color masterbatch composition of claim 1, wherein a particle size (D90) of the liquid color masterbatch composition is between 310 nm and 390 nm.

3. The liquid color masterbatch composition of claim 1, wherein the lubricant comprises polyethylene glycol, and a weight average molecular weight of the polyethylene glycol is between 180 g/mole and 220 g/mole.

* * * * *